United States Patent

Gong

[11] Patent Number: 6,118,609
[45] Date of Patent: Sep. 12, 2000

[54] METHOD TO ADJUST HEAD SWITCH TIME FOR IMPROVED DISK DRIVE PERFORMANCE

[75] Inventor: Karl Gong, San Jose, Calif.

[73] Assignee: International Business Machines Corporation, Armonk, N.Y.

[21] Appl. No.: 09/102,733

[22] Filed: Jun. 22, 1998

[51] Int. Cl.⁷ ................................................ G11B 15/12
[52] U.S. Cl. ............................................. 360/61; 360/63
[58] Field of Search ......................................... 360/61, 63

[56] References Cited

U.S. PATENT DOCUMENTS

| 4,270,154 | 5/1981 | Crawford | 360/98 |
| 4,563,715 | 1/1986 | Kawamura et al. | 360/78 |
| 5,426,758 | 6/1995 | Candelaria et al. | 395/425 |
| 5,432,659 | 7/1995 | Kosugi et al. | 360/77.02 |
| 5,475,544 | 12/1995 | Takeuchi | 360/77.08 |
| 5,969,895 | 10/1999 | Ueda et al. | 360/61 |

FOREIGN PATENT DOCUMENTS 0673033  9/1995  European Pat. Off. ........ G11B 21/08

OTHER PUBLICATIONS

"Method to Avoid Long Head Switch Times", IBM Technical Disclosure Bulletin vol. 38, No. 4, Apr. 1995, p. 147.

*Primary Examiner*—Paul Loomis
*Assistant Examiner*—Dan I. Davidson
*Attorney, Agent, or Firm*—Robert B. Martin; Noreen A. Krall; Abdy Raissinia

[57] ABSTRACT

A disk drive having an improved method of adjusting the head switch time to improve disk drive performance. In the process of writing or reading long data files, the heads on the actuator are sequentially selected in order to access all the data tracks forming a cylinder in the shortest time. Head offsets are significantly smaller for switching between heads mounted on the same actuator arm than for switching between heads mounted on different actuator arms. Therefore improved disk drive performance is obtained by using two values of head switch time instead of one. The head switch time allocated for switching from a first head on one actuator arm to a second head on a second actuator arm is made longer than the head switch time allocated for switching from a first head on one actuator arm to a second head on the same actuator arm. By allocating longer time for the head switches between different actuator arms, the error flag rate for heads not ready is reduced. The average head switch time is reduced without increasing error rates by separately optimizing the head switch times for same actuator arm head switches and different actuator arm head switches.

7 Claims, 7 Drawing Sheets

METHOD TO ADJUST HEAD SWITCH TIME FOR IMPROVED DISK DRIVE PERFORMANCE

BACKGROUND OF THE INVENTION

1. Field of the Invention

This invention relates in general to disk drives, and in particular to a method and apparatus to adjust head switching times to improve disk drive performance.

2. Description of Related Art

Magnetic disk drives are information storage devices which utilize at least one rotatable magnetic media disk having concentric data tracks defined for storing data. The magnetic media disk or disks in the disk drive are mounted to a spindle. The spindle is attached to a spindle motor which rotates the spindle and the disks to provide read/write access to the various portions on the concentric tracks on the disks.

Each disk mounted on the spindle has a top surface and a bottom surface on which the concentric data tracks are defined. Associated with each disk surface is a magnetic recording head supported over the disk surface by a suspension fixed to an actuator arm. The actuator arms are arranged in a comb-like fashion extending between the disks mounted to the spindle to form a disk stack. The top actuator arm extends over the top surface of the top disk forming the disk stack and the bottom actuator arm extends over the bottom surface of the bottom disk forming the disk stack. Actuator arms disposed on the actuator between the top arm and the bottom arm penetrate between two disks in the disk stack and extend over the top surface of the lower disk and the bottom surface of the next higher disk in the stack. Each actuator arm that extends between two disks supports two heads (slider/transducer), a lower head that accesses data tracks on the top surface of the lower disk, and an upper head that accesses data tracks on the bottom surface of the upper disk. The top and bottom actuator arms each support one head that accesses the top surface of the top disk in the disk stack and the bottom surface of the bottom disk in the disk stack, respectively. As the actuator is moved about its pivot point, all the heads in the disk drive move simultaneously in an arcuate fashion across the surfaces of the disks forming the disk stack. At any position of the actuator, every head is positioned over its corresponding data track on a disk surface of the disk stack. This configuration of a stack of circular data tracks at substantially the same radius of the disks and corresponding to the plurality of heads in the disk drive is referred to as a cylinder. The number of cylinders in a disk drive is equal to the number of data tracks on each disk.

A rotary voice coil motor (vcm) is attached to the rear portion of the actuator arm or arms to power movement of the actuator. When the actuator is radially positioned by the vcm at a radius of the disk stack corresponding to a cylinder, an individual data track on any disk surface that forms part of that cylinder may be accessed by electrically switching to select the head positioned over the desired data track.

When a comparatively large data file is to be written to or read from the disk drive, the actuator is moved to position the heads on a target cylinder and then the heads are selected in a sequential order corresponding to the data track on that cylinder on each disk surface of the disk drive. After the last head is selected, the actuator is moved to position the heads on the next cylinder and the heads are again selected in the same sequential order to access the data tracks on the new cylinder in the same way as with the previous cylinder. This process is continued until the entire data file is written or read.

When the heads are selected sequentially on the same cylinder, the head position may be shifted or offset from the center of the data track. It is necessary to move the actuator to correct the shift or head offset to position the head over the center of the data track. A head positioning controller finely adjusts the actuator position to correct the head offset as quickly as possible after the head select operation so as to allow a high speed write or read operation.

A head switch time corresponding to the time required for the actuator to correct the head offset must be allocated and programmed in the disk drive controller. After a head select command, read or write operations must be delayed by this head switch time since the actuator with all the heads is moving in order to correct the head offset. The usual procedure is to allocate a single head switch time for any head select operation, the head switch time being set as the time required to correct the largest head offset expected for any head in the disk drive. Since disk drive performance, as measured by operation speeds, is a function of head switch time, it is desirable to minimize the allocated time.

A problem arises when an occasional event occurs in which a head offset exceeds the largest expected offset used in setting the head switch time. In this event, the head offset correction procedure will not be completed in the allocated head switch time, resulting in generation of an error flag by the disk drive controller signaling that the drive is not ready to read from or write to the target data track. In high performance disk drive, these error flag events, which cause a minimum delay of one disk rotation period, must be avoided.

It therefore can be seen that there is a need for a method for reducing the head switch time and for reducing the incidence of head switch errors in order to improve the performance of the disk drive.

SUMMARY OF THE INVENTION

To overcome the shortcomings of the prior art described above, it is the object of the present invention to disclose a method to adjust the sequential head switch time for data accessing operations to improve the data file error rate.

It is another object of the present invention to disclose the use of two different head switch times for sequential head switching operations to improve disk drive performance.

It is yet another object of the present invention to disclose a method to improve head switching performance by allocating a longer head switch time for switches between heads on different actuator arms and a shorter head switch time for switches between heads on the same actuator arm.

Briefly stated, the present invention addresses the above described problems by assigning two different head switch times to allow time for the disk drive servo system and the vcm to correct for head offsets during sequential head select operations. In accordance with the present invention, a longer head switch time is allocated for head switches between heads on different actuator arms and a shorter time is allocated for head switches between heads on the same actuator arm. By allocating a longer time to head switches between heads on different actuator arms, more margin is provided for correction of the largest head offsets resulting in reduced error rates of the disk drive. Separately optimizing the two head switch times allows the error rate and performance of the disk drive to be improved.

The above, as well as additional objects, features, and advantages of the present invention will become apparent in the following detailed written description.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
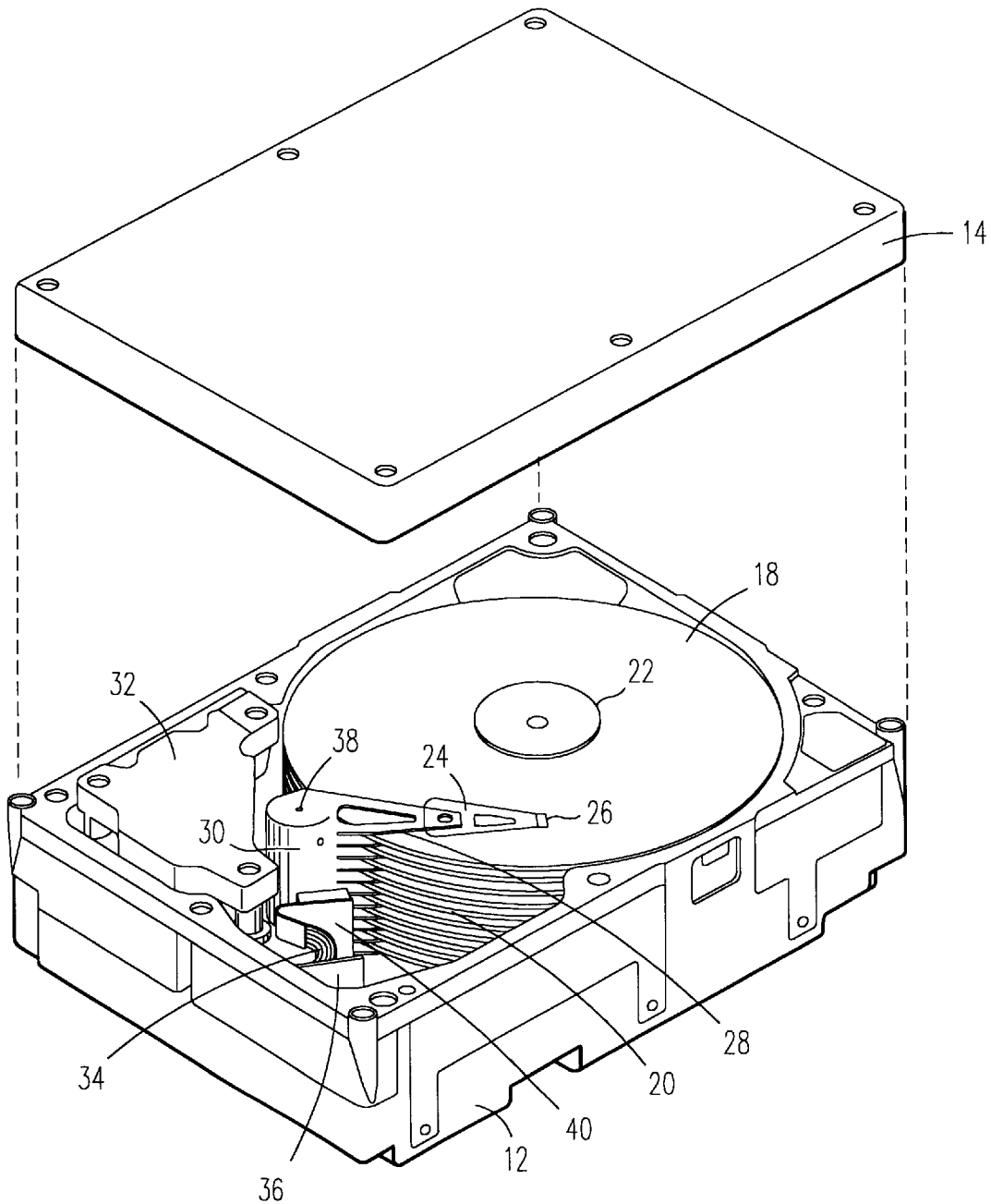
FIG. 1 is a perspective view of the disk drive of the present invention illustrating the relative placement of the components.

FIG. 1 shows a disk drive system designated by the general reference number 10. The lid 14 of the disk drive is shown exploded. In operation, the lid would be disposed on top of the housing 12.

The disk drive comprises one or more magnetic disks 18. The disks 18 may be conventional particulate or thin film recording disks, which are capable of storing digital data in concentric tracks. In a preferred embodiment, both sides of the disks 18 are available for storage, and it will be recognized by one of ordinary skill in the art that the disk drive 10 may include any number of such disks 18.

The disks 18 are mounted to a spindle 22. The spindle 22 is attached to a spindle motor (not shown) which rotates the spindle 22 and the disks 18 to provide read/write access to the various portions of the concentric tracks on the disks 18.

An actuator assembly 30 includes a positioner arm 28, and a suspension assembly 24. The suspension assembly 24 includes a slider/transducer assembly 26 at its distal end. Although only one slider/transducer assembly 26 of the suspension assembly 24 is shown, it will be recognized that the disk drive 10 has one slider/transducer assembly 26 for each side of each disk 18 included in the drive 10. The positioner arm 28 further comprises a pivot 38 around which the positioner arm 28 pivots.

The disk drive 10 further includes an amplifier chip 40. As is well known in the art, the amplifier chip 40 cooperates with the slider/transducer assembly on the slider assembly 26 to read data from or write data to the disks 18. A flexible printed circuit member or actuator flex cable 34 carries signals between the amplifier chip 40 and a connector pin assembly (not shown) which interfaces with the external signal processing electronics. The actuator flex cable 34 leading from the amplifier chip 40 is attached to an arm electronics (AE) bracket 36 which directs the actuator flex cable 34 to a connector port for connection to the connector pin assembly.

The main function of the actuator assembly 30 is to move the positioner or actuator arm 28 around the pivot 38. Part of the actuator assembly 30 is the voice coil motor (vcm) assembly 32 which comprises a vcm bottom plate, a magnet and a vcm top plate in combination with an actuator coil. Current passing through the actuator coil interacts with the magnetic field of the magnet to rotate the positioner arm 28 and suspension assembly 24 around the pivot 38, thus positioning the transducer/suspension assembly as desired.

Figure 2:
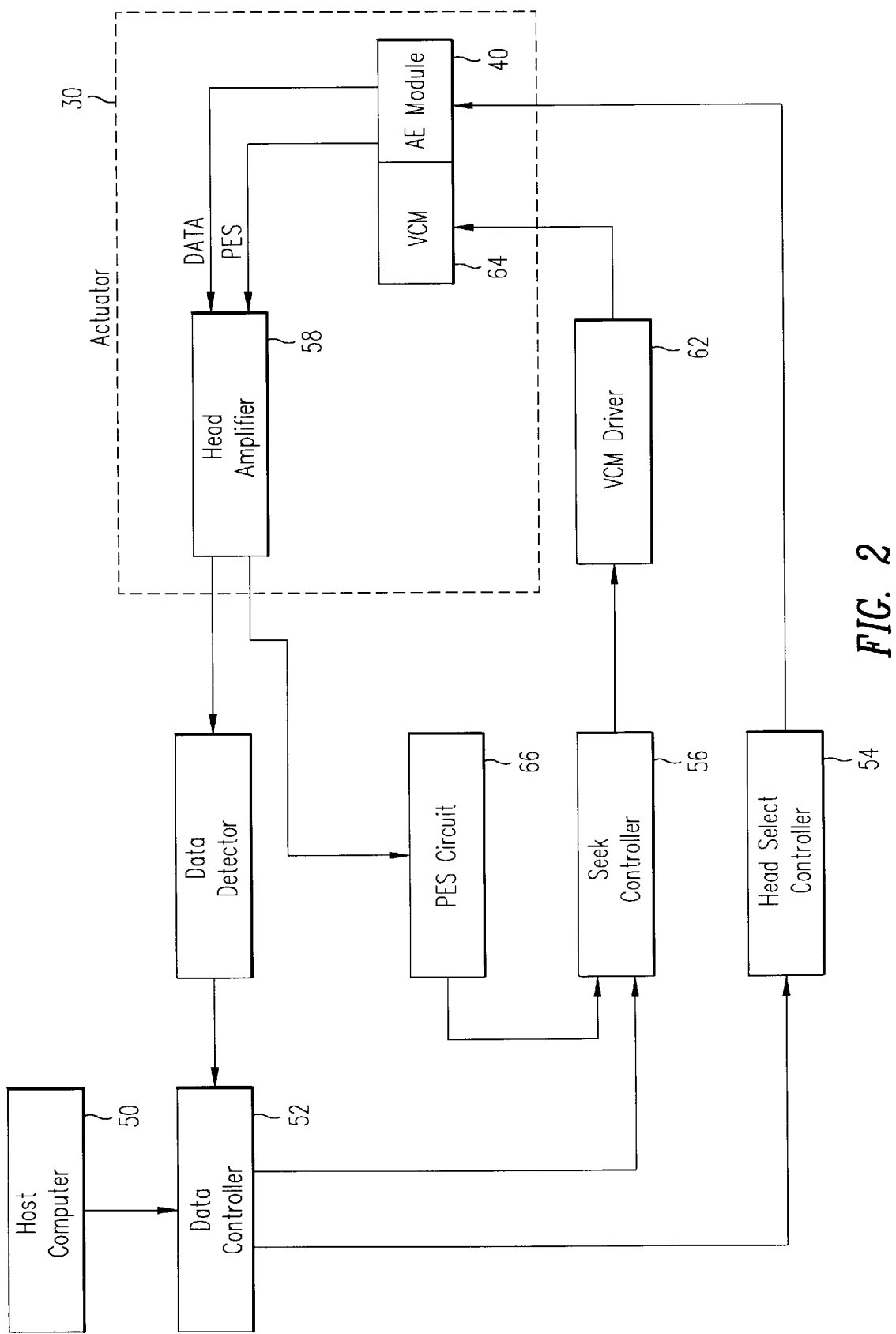
FIG. 2 is a block diagram illustrating the head select and head positioning circuits in the disk drive.

FIG. 2 shows the electronics that control head select and actuator movement to position the desired slider/transducer over a data track on a disk in order to write data to or read data from the disk. Signals from host computer 50 cause data controller 52 to identify a specific track location on a disk where data is to be written to or read from. Data controller 52 signals to head select controller 54 to select the head number associated with the required disk surface and to the seek controller 56 to move the actuator 30 radially over the disk surfaces to position the selected head over the desired track. Head select controller 54 signals the arm electronics (AE) module 40 to activate the selected head. Seek controller 56 signals the voice coil motor (vcm) 62 driver to supply electric current to the vcm 64 to move actuator 30 to position the selected head over the desired track on a disk surface. The readback signal from the head is detected at the AE module 40 generates a position error signal (PES) which provides a feedback signal past through amplifier 58 to the PES circuit 66 connected to seek controller 56 forming a servo loop to position the head optimally over the desired track.

When a comparatively large data file is to be written to or read from the disk drive, drive performance is improved by moving the actuator 30 to position all the heads at a disk radius defining a cylinder and then sequentially selecting the heads to write data to or read data from each disk track in the cylinder.

Figure 3:
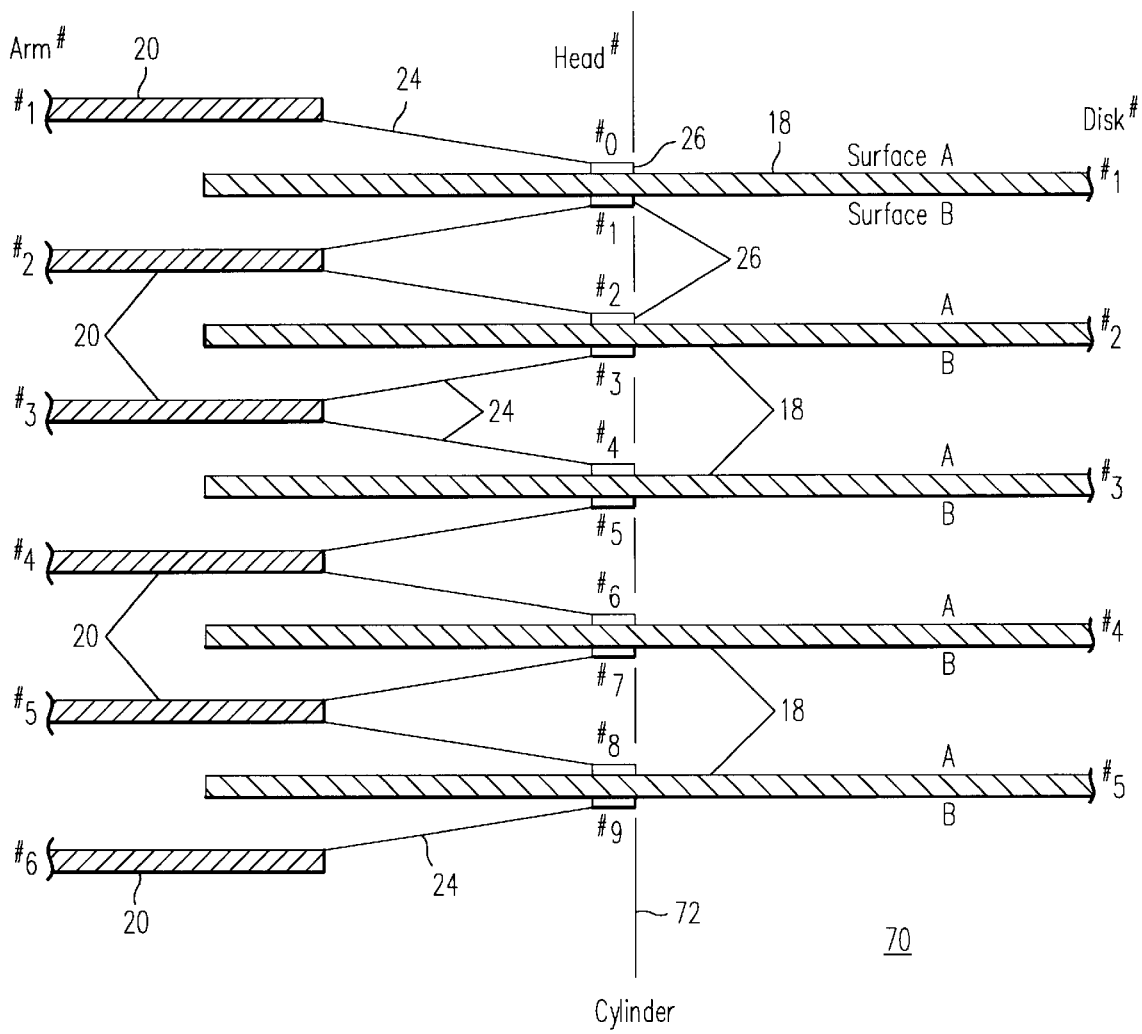
FIG. 3 is a simplified perspective view of the actuator and disk stack illustrating the sequence of head select operations in the disk drive.

FIG. 3 illustrates the stack arrangement 70 in the disk drive showing the arms 20, heads 26 and disks 18 with the actuator 30 positioned to a disk radius corresponding to a cylinder 72 comprising a data track on each disk surface in the disk drive. Stack arrangement 70 comprises 5 disks 18 numbered sequentially from top disk #1 to bottom disk #5, 6 actuator arms 20 numbered sequentially from top actuator arm #1 to bottom actuator arm #6, and 10 heads 26 numbered sequentially from top head #0 to bottom head #9. Heads 26 are each supported over the surface of a disk 18 by a suspension 24 fixed to an actuator arm 20. Cylinder 72 comprises a plurality of circumferential data tracks with one track on each surface of each disk 18 over which a head 26 is supported, said plurality of data tracks all having substantially the same radial position on each disk surface.

To access a long data file, head #0 is selected and actuator 30 is moved to position head #0 over the desired data track on surface A of disk #1. After the entire disk track on surface A of disk #1 has been accessed by head #0, head #1 is selected to access the data track at substantially the same radius on surface B of disk #1. The process of sequentially accessing each data track of the cylinder 72 proceeds with selection of head #2 to access the data track on surface A of disk #2. Head selection continues incrementing head number by 1 until selection of head #9 to access the data track on surface B of disk #5. To further continue this sequential accessing process of a data file, head #0 is again selected and the actuator is moved to position head #0 over a different (usually adjacent) track on surface A of disk #1 and the process of sequential accessing through a new cylinder 72 is repeated.

When the heads 26 are selected sequentially to access data tracks on a cylinder 72, the position of the selected head is displaced or offset from the center of the data track being accessed. A position error signal (PES) is generated resulting in movement of the actuator 30 to correct the head offset by positioning the head 26 over the center of the data track. A head switch time corresponding to the time required to correct the head offset must be allocated and programmed in the disk format and drive controller. After a head select command, read or write operations must be delayed by this head switch time since the actuator with all the heads is moving radially relative to the data tracks during the head offset correction process.

Figure 4:
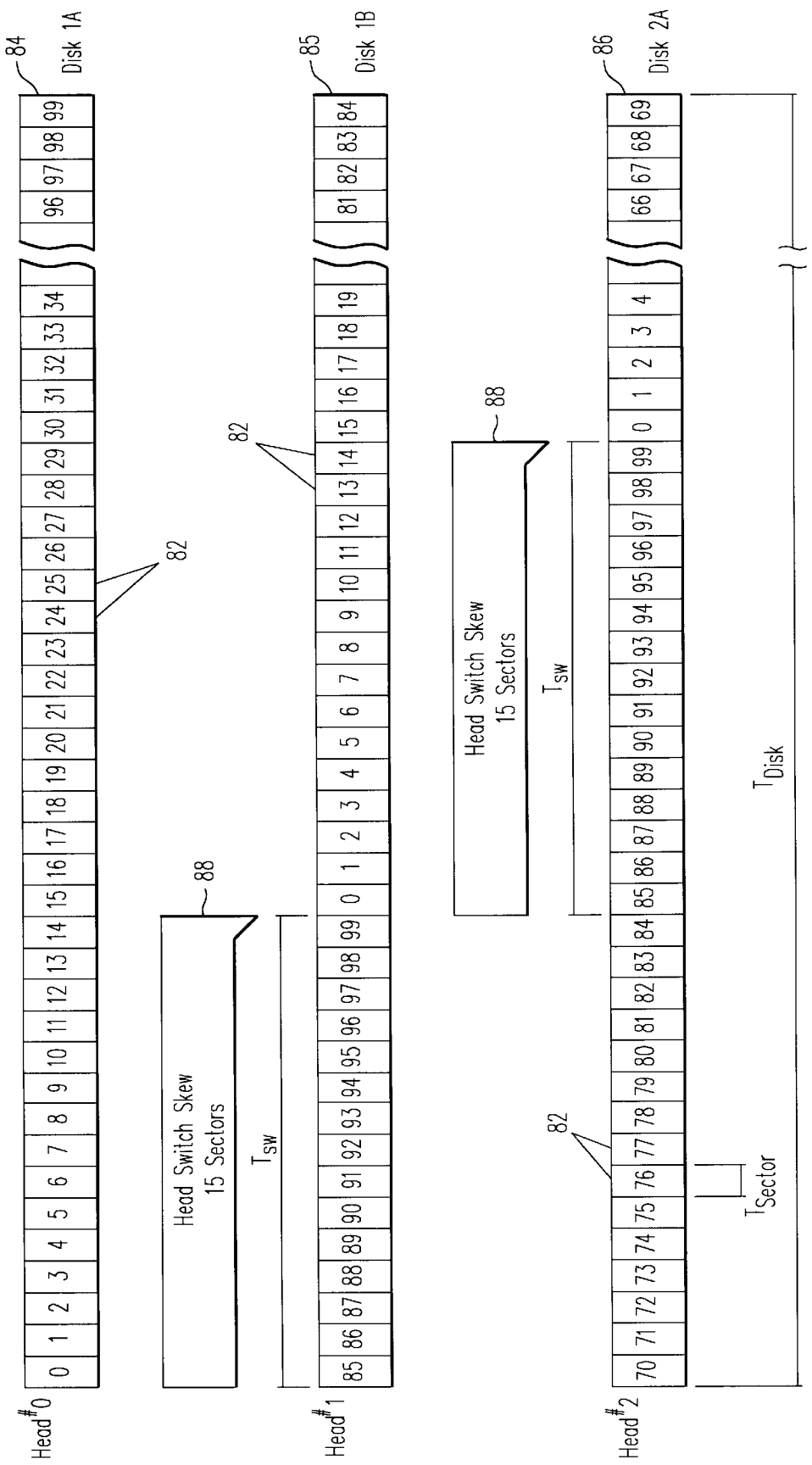
FIG. 4 is an illustration showing an example of the head switch timing sequence found in the prior art.

FIG. 4 shows the head switch timing sequence 80 found in the prior art. The first three data tracks of the stack of data tracks forming a cylinder 72 are illustrated. The data track 84 on surface A of disk #1 is the first track on the cylinder 72 on which a data file is to be accessed. Head #0 is the head 26 that accesses this data track. The data track 84 is divided into a plurality of equal length sectors 82 (100 sectors in this example) into which data is recorded. The length of data track 84 is associated with a time duration, $T_{disk}$, equal to the period of rotation of the disk in the disk drive. For a disk drive having a disk rotation velocity of 7200 RPM, $T_{disk}$ is 8.33 milliseconds for any data track in the disk drive. Each sector 82 is associated with a time duration, $T_{sector}$, giving the time duration for each sector to pass under the head 26 ($T_{sector}$ is 83.3 microseconds in the present example).

With head #0 selected, sectors #0 to #99 of disk track 84 on surface A of disk #1 are sequentially accessed (for a read or write operation). When accessing to sector #99 is finished, head #1 is selected to switch to accessing a data track 85 on surface B of disk #1. A head switch time, $T_{sw}$, delays any read or write operation until the actuator positions head #1 exactly over the data track 85 on surface B of disk #1. Because of the delay by time $T_{sw}$, sector #0 of data track 85 on surface B of disk #1 is offset or skewed relative to sector #0 of data track 84 by a number of sectors, referred to as the skew 88, equivalent to the head switch time, $T_{sw}$ (fifteen sectors in the present example). Head #1 now accesses sequentially from sector #0 to sector #99 on data track 85 of surface B on disk #1. When head #1 has accessed sector #99, a head switch to head #2 is made to access disk track 86 on surface A of disk #2. As the cylinder 72 is accessed, head switching proceeds sequentially by head number, continuing until head #9 is selected in order to access the last data track of the cylinder (data track on surface B of disk #5). With each head switch operation the time delay for $T_{sw}$ results in a skew 88 of 15 sectors of sector #0 relative to the preceding track on the cylinder 72. Head switch time, $T_{sw}$, is chosen to be just longer than the longest time expected to correct the largest head offset expected for the disk file. Occasional head switch events occur where the time required to correct the larger than expected head offset is longer than the predetermined value of the head switch time, $T_{sw}$. In this event, the controller detects that the actuator is still moving after time duration $T_{sw}$ and an error condition or error flag is generated signaling that the head is not ready. The error flag results in a delay of $T_{DISK}$ to allow the disk to rotate one revolution to again bring sector #0 under the selected head.

Figure 5:
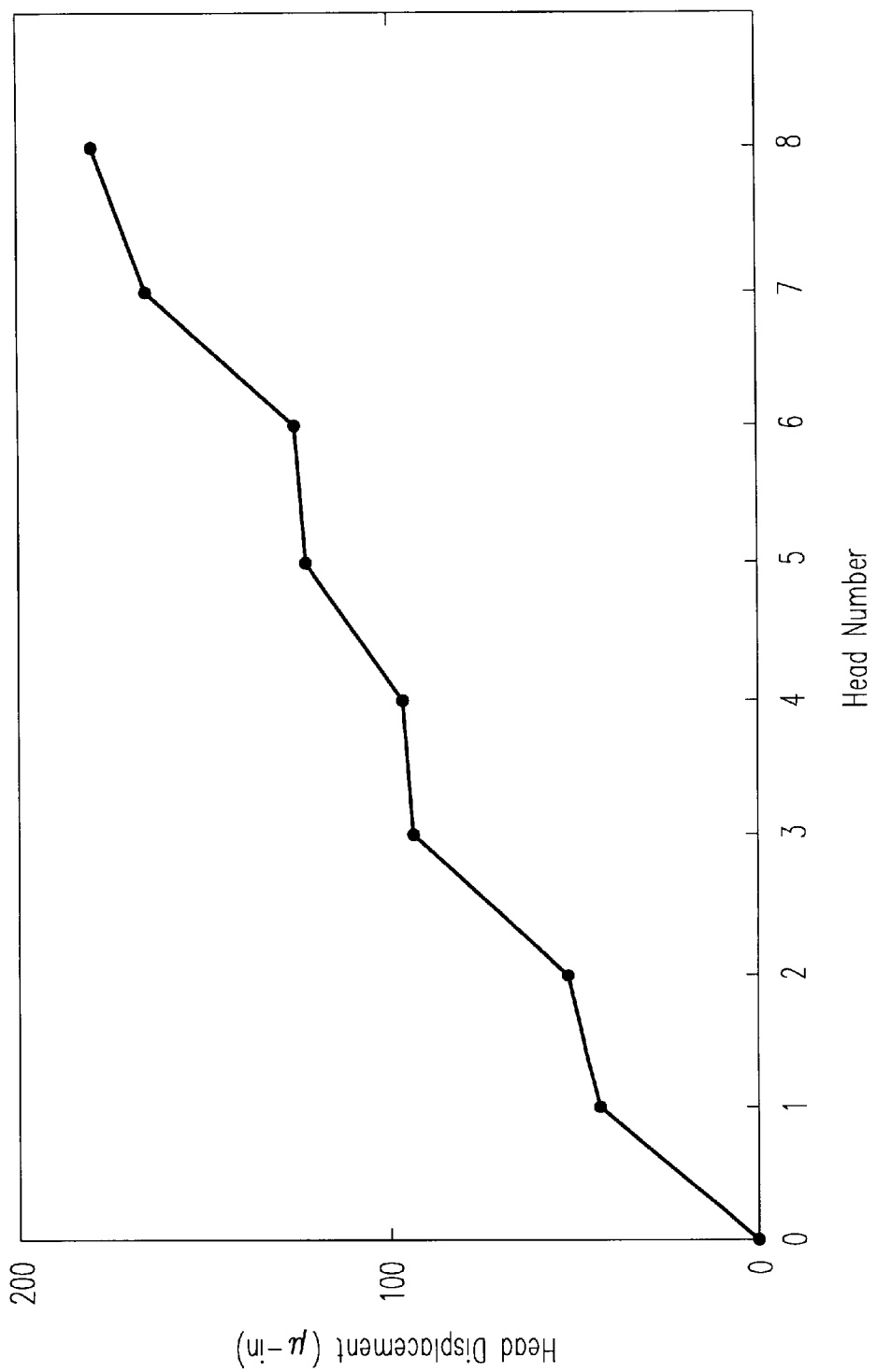
FIG. 5 is a graph showing measured head offsets in a disk drive.

FIG. 5 shows measured head displacements relative to a fixed datum for a prior art switch method. The head displacement needed to center each head over a disk track in the same cylinder is plotted as the heads are sequentially selected in order from head #0 to head #8. The incremental changes in the measured head deflections as the heads are switched is the head offset. The first head switch, from head #0 to head #1, required a head offset of 43 microinches. The second head switch in the sequence, from head #1 to head #2, required a head offset of 7 microinches. The third head switch, from head #2 to head #3, required a head offset of 42 microinches.

Table 1 lists the head offsets for each head switch from the data of FIG. 5. The data of Table 1 shows that head switches from even numbered heads to odd numbered heads (for example, from head #0 to head #1) require significantly greater offsets than head switches from odd numbered heads to even numbered heads (for example, from head #1 to head #2). The average offset for an even to odd number head switch is 39 microinches, while for an odd to even number head switch the average offset is only 6 microinches.

TABLE 1

| Head Switch | Offset (micro-inches) |
| --- | --- |
| 0 to 1 | 43 |
| 1 to 2 | 7 |
| 2 to 3 | 42 |
| 3 to 4 | 2 |
| 4 to 5 | 28 |
| 5 to 6 | 2 |
| 6 to 7 | 44 |
| 7 to 8 | 13 |

Referring to FIG. 3, it can be seen that even to odd number head switches are switches from a first head connected to one arm to a second head connected to a different arm (for example, head #0 is connected to arm #1 and head #1 is connected to arm #2). Odd to even number head switches are switches from a first head connected to an arm to a second head connected to the same arm (for example, both head #1 and head #2 are connected to arm #2).

Figure 6:
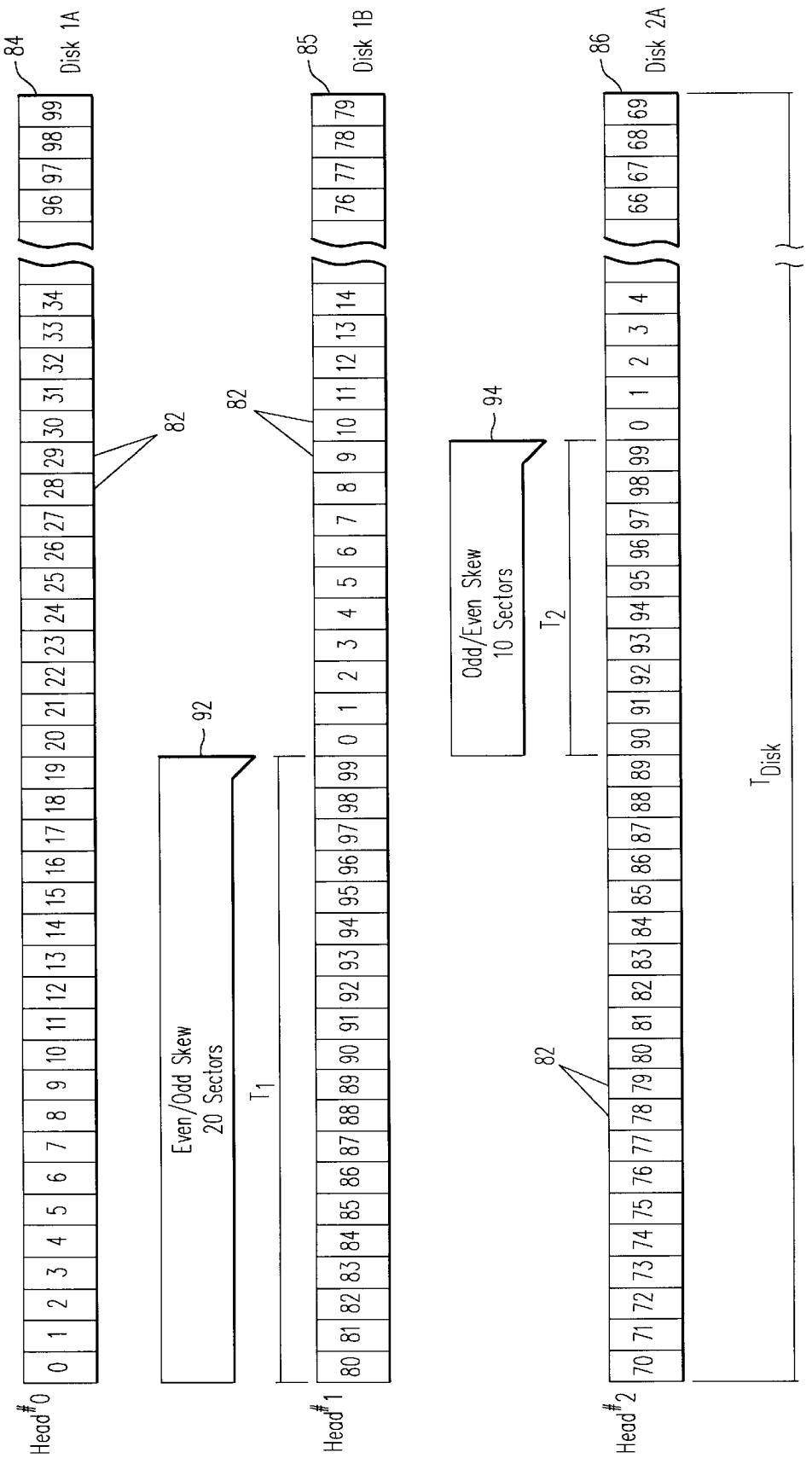
FIG. 6 is an illustration showing an example of the head switch timing sequence of the present invention.

FIG. 6 shows the head switch timing sequence 90 of a disk drive according to the preferred embodiment of the present invention. Because the average head offset required to center the head over a data track for an even/odd number head switch is different from the average head offset required for an odd/even number head switch, different values of head switch time are used for even/odd head switches (heads on different actuator arms) and for odd/even head switches (heads on the same actuator arm). For a head switch from head #0 accessing the data track 84 on surface A of disk #1 to head #1 accessing the data track 85 on surface B of disk #2 (even/odd head switch), a head switch time $T_1$ delays any read or write operation to allow time for the actuator to position head #1 over the center of the data track 85 on surface B of disk #1. Because of the delay by time $T_1$, an even/odd skew 92 equivalent to 20 sectors 82 is allocated for this switch from an even numbered head to an odd numbered head. For the head switch from head #1 accessing data track 85 to head #2 accessing data track 86 on surface A of disk #2 (odd/even head switch), a head switch time $T_2$ delays any read or write operation to allow time for the actuator to position head #2 over the center of data track 86. Because of the delay of write or read operations by time $T_2$, an odd/even skew 94 equivalent to 10 sectors 82 is allocated for this switch from an odd numbered head to an even numbered head. As cylinder 72 is accessed, head switching proceeds sequentially by head number, continuing until head #9 is selected to read the last data track on cylinder 72. When a head switch is from an even number head to an odd number head (from a head on one arm to a head on a different arm), a head switch time $T_1$ is used to allow correction for the head offset. When a head switch is from an odd number head to an even number head (from a head on one arm to the other head on the same arm), a head switch time $T_2$ is used to allow correction for the head offset. Head switch times $T_1$ and $T_2$ are programmed in the data file controller circuits.

With the average time delay $(T_1+T_2)/2=1.2$ milliseconds, $T_1=1.6$ milliseconds and $T_2=0.8$ milliseconds, the disk file accessing rate remains the same as for the prior art disk file, however the error flag rate due to head correction times longer than 1.2 milliseconds is significantly reduced. This error flag rate improvement results from increasing the margin for the longest head switch times (even/odd switches) from 1.2 milliseconds to 1.6 milliseconds while having no significant effect on the error flag rate for the shorter head switch times (odd/even switches).

Figure 7:
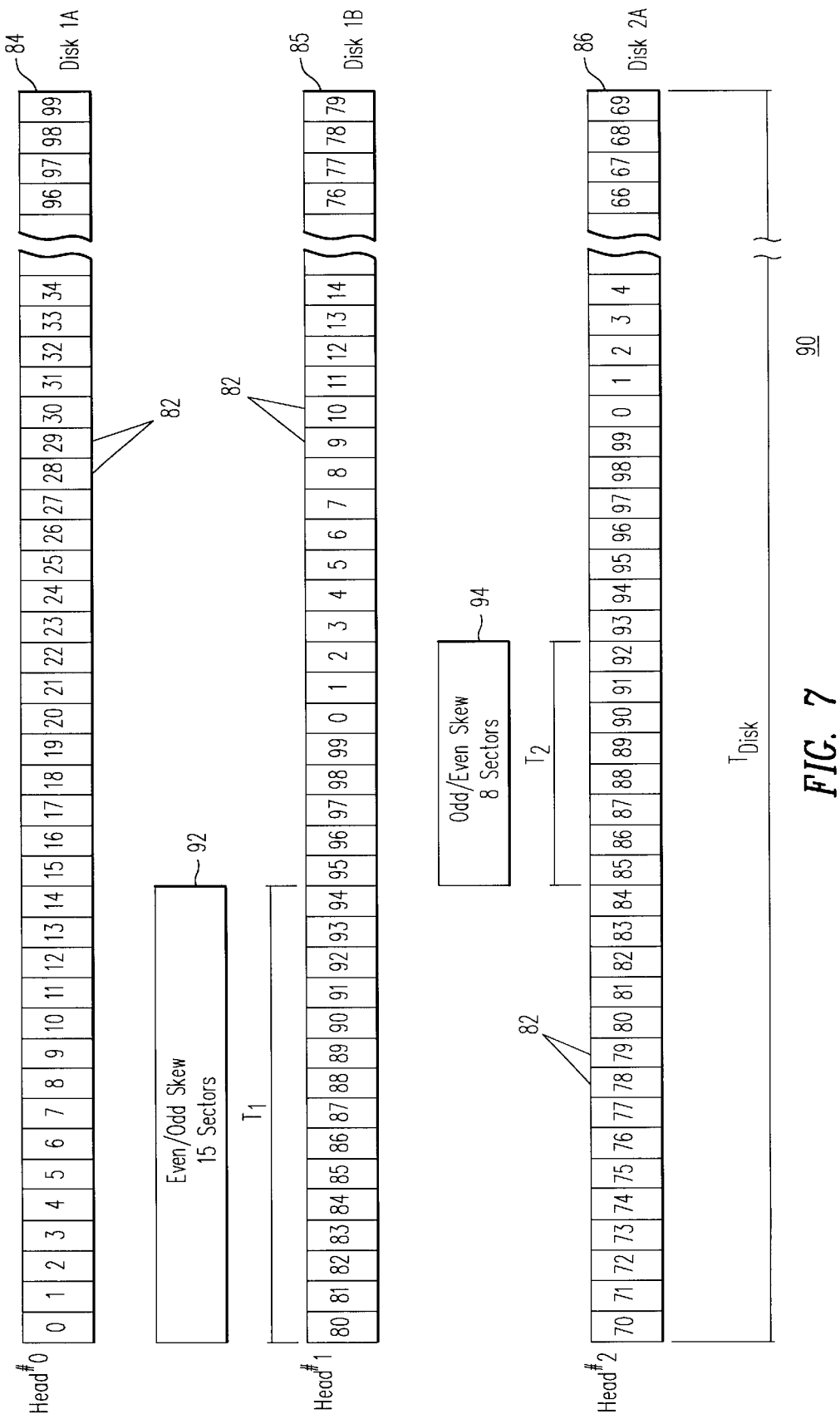
FIG. 7 is an illustration showing an example of an alternative embodiment of the head switch timing sequence of the present invention.

FIG. 7 shows an alternative embodiment of the present invention. In this alternative, the delay, $T_1$, an even/odd skew 92 is maintained at 15 sectors 82. For the head switch time from head #1, odd/even head switch time, but the odd/even head switch time $T_2$ for the head switch from head #1 accessing data track 85 to head #2 accessing data track 86 on a surface A of disk #2 (odd/even head switch), is delayed by less than the time $T_1$. Because of the delay of write or read operations by time $T_2$, an odd/even skew 94 equivalent to 8 sectors 82 is allocated for this switch from an odd numbered head to an even numbered head. As cylinder 72 is accessed, head switching proceeds sequentially by head number, continuing until head 49 is selected to read the last data track on cylinder 72.

The ratio of odd/even skew 94 to even/odd skew 92 can be selected to be equal to or less than the compensation ratio in the head switch. As in the example of Table 1, the minimum ratio is 44/13 or greater than 3. Therefore, $T_1/T_2$ should be 3 or less. For $T_1$ of 15 sectors, then $T_2$ can be 5 sectors or higher.

Moreover, a combination of the two embodiments can also be implemented, thus improving the error rate as well as reducing the total head switch time.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

What is claimed is:

1. A method of adjusting a head switch time in a disk drive to improve disk drive performance comprising the steps of:
   determining if a head switch is between heads mounted on the same actuator arm; and
   allocating a shorter head switch time if the head switch is between the heads on the same actuator arm.

2. A method of adjusting a head switch time in a disk drive to improve disk drive performance comprising the steps of:
   determining if a head switch is between heads mounted on different actuator arms; and
   allocating a longer head switch time if the head switch is between the heads on different actuator arms.

3. In a disk drive having two values for head switch times for switching between heads when reading or writing data, a method of adjusting the head switch time to improve disk drive performance comprising the steps of:
   allocating a shorter head switch time if the head switch is between heads on the same actuator arm; and
   allocating a longer head switch time if the head switch is between heads on different actuator arms.

4. In a disk drive having two values for head switch times for switching between heads when reading or writing data, a method of adjusting the head switch time to improve disk drive performance comprising the steps of:
   determining if a head switch is between heads mounted on the same actuator arm;
   allocating a shorter head switch time if the head switch is between heads on the same actuator arm; and
   allocating a longer head switch time if the head switch is between heads on different actuator arms.

5. In a disk drive having two values for head switch times for switching between heads when reading or writing data, a method of adjusting the head switch time to improve disk drive performance comprising the steps of:
   determining if a head switch is between heads mounted on different actuator arms;
   allocating a shorter head switch time if the head switch is between heads on the same actuator arm; and
   allocating a longer head switch time if the head switch is between heads on different actuator arms.

6. In a disk drive having two values for head switch times for switching between heads when reading or writing data, a method of adjusting the head switch time to improve disk drive performance comprising the steps of:
   determining if a head switch is between heads mounted on the same actuator arm or different actuator arms;
   allocating a shorter head switch time if the head switch is between the heads on the same actuator arm; and
   allocating a longer head switch time if the head switch is between heads on different actuator arms.

7. A magnetic storage system comprising:
   a plurality of disks with data surfaces of concentric data tracks;
   a spindle shaft supporting said disks, said spindle shaft for rotating said disks about an axis generally perpendicular to the disk;
   a slider for each data surface, maintained in operative relationship with the data surface when the disk is rotating;
   a magnetic head attached to the slider for reading data from and writing data to the data surface;
   an actuator for moving the slider generally radially relative to the disk to allow the magnetic head to access data tracks, said actuator further comprising a plurality of arms arranged in a comb-like fashion, wherein the outermost arms support one magnetic head and the other arms support two magnetic heads;
   detecting means for detecting if a head switch is required between heads on the same actuator arm or between head or different actuator arms; and
   allocating means for allocating a shorter head switch time for head switches between heads on the same actuator arm and a longer head switch time for head switches between heads on different actuator arms.

* * * * *